May 29, 1956     M. LEICHSENRING     2,748,218
FLUID OPERATED CYCLIC CONTROL FOR BRAKE LIGHT CIRCUITS
Filed July 8, 1952
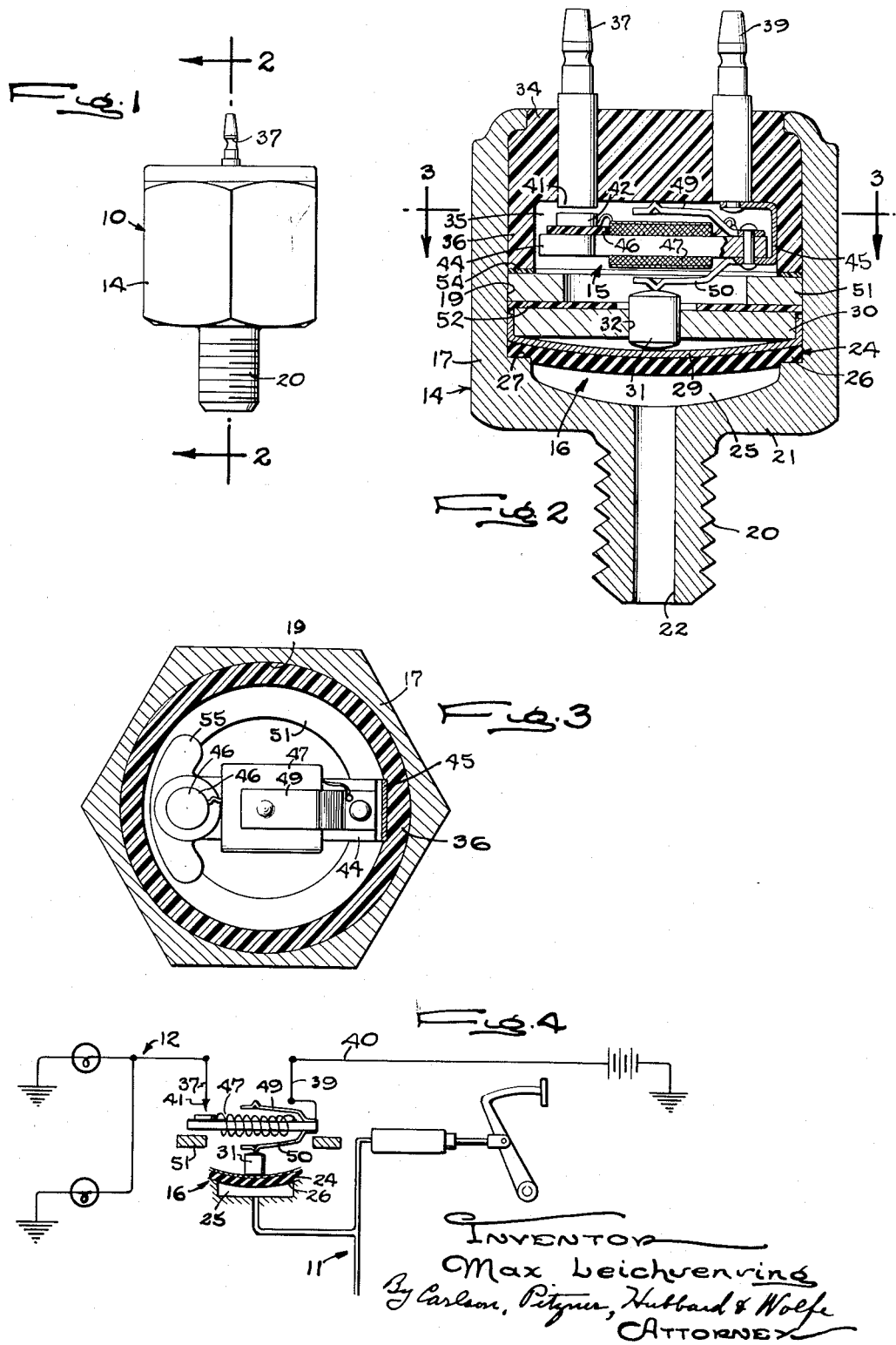

United States Patent Office 2,748,218
Patented May 29, 1956

2,748,218

FLUID OPERATED CYCLIC CONTROL FOR BRAKE LIGHT CIRCUITS

Max Leichsenring, Chicago, Ill.

Application July 8, 1952, Serial No. 297,709

5 Claims. (Cl. 200—83)

The present invention relates to a compound signal control device for use with the hydraulic brake system of an automotive vehicle to control the vehicle brake lights in response to the application and release of the brakes.

One object of the invention is to provide a unitary electrical control device of simplified, inexpensive construction capable of effecting cyclic control of vehicle brake lights directly in response to pressurization of brake fluid. A related object is to provide a single integrated control of this character which is specially suited to be conveniently substituted in place of conventional pressure actuated controls which provide only for steady energization of associated brake light circuits.

Another object is to provide a brake light circuit control device having an electrical control assembly capable of producing a cyclic circuit closing action directly in response to mechanical movement of a hydraulic actuator contained in a casing common to the control assembly. A collateral object is to provide a compound control unit of this type in which fluid sealing elements of the hydraulic actuator are augmented by secondary structural elements which afford further and positive assurance that the fluid-tight integrity of the device will not be disrupted by pressurized brake fluid.

An additional object is to provide a control device of the foregoing characteristics which is not only trouble-free in operation, but which is, despite its added functional attributes, also suited to efficient maintenance of the electric system into which it is installed.

Other objects and advantages will be perceived from the following description of the exemplary form of the invention illustrated in the drawings, in which:

Figure 1 is a side view of an integrated control device embodying the invention.

Fig. 2 is a longitudinal sectional view on an enlarged scale taken along line 2—2 of Fig. 1 and showing internal structural elements of the unit.

Fig. 3 is a transverse sectional view taken along line 3—3 of Fig. 2.

Fig. 4 is a diagrammatic view showing certain primary working parts of the control device and illustrating the manner in which the device is correlated with the hydraulic brake system and the brake light system of a vehicle (not shown).

Although certain advantages are inherent in the specific correlation of structural elements forming the illustrative embodiment of the invention, it will be understood that the invention is not limited to the specific form shown, but embraces all equivalent embodiments falling within the spirit and scope of the invention as expressed in the appended claims.

Referring in greater detail to the drawing, the compound electrical control device 10 constituting the exemplary form of the invention comprises a single self-contained unit (Figs. 1, 2, and 3) adapted to be connected hydraulically to the fluid brake system 11 (Fig. 4) of a vehicle (not shown) and electrically interposed in the vehicle brake light system 12 to effect a pulsating energization of the latter in response to an application of the brakes. Structurally, the control device comprises a single integrated casing 14 of hollow construction. The casing contains a cyclic electrical control assembly 15 operable in response to the mechanical action of a hydraulic actuator 16 disposed in the casing adjacent the control assembly.

In the present instance, the casing 14 includes a cup-shaped body 17 defining a generally cylindrical cavity 19 and preferably shaped externally for convenient rotation by a wrench. This body 17 is equipped with a dual-purpose attachment fitting 20 adapted to be interconnected with a complementary fitting on the hydraulic brake system 11 to support the control unit and to serve as a conduit for establishing communication between the fluid brake system and the casing cavity 19. Preferably, the casing fitting 20 is designed for connection to the brake system fitting (not specifically illustrated in the drawing) conventionally provided to receive simple control switches which provide only for continuous energization of the electrical brake light circuit. Thus, in this instance the casing fitting 20 is formed as an externally threaded nipple depending from the floor portion 21 of the casing 14. An axial bore or port 22 extends centrally through the nipple to form a fluid inlet into the lower end of the casing cavity 19.

The previously mentioned mechanical actuator 16 is disposed in the lower or bottom end of the casing body 17 and comprises a fluid pressure responsive member 24 extending transversely across the casing cavity 19 in spaced contiguous relation to the casing floor 21 to define therewith a thin annular compartment 25 adapted to communicate hydraulically through the bore 22 with a fluid brake system. Generally, the actuator 16 is designed to produce alternate mechanical control movements in response to increases and decreases respectively to the fluid pressure within the compartment 25. In this instance, the pressure responsive member 24 of the actuator 16 comprises a flexible disk-like diaphragm 26 of rubber-like material. The peripheral edge of the diaphragm 26 rests upon and forms a fluid-tight seal with an annular shoulder 27 formed on the inner cylindrical wall of the casing body 17 in spaced relation to the casing floor 21. The diaphragm 26 is backed by a downwardly convex, dish-shaped reinforcing member 29 of resilient metallic construction. The peripheral edge of this reinforcing member 29 is bent upwardly to form with the member a flat pocket for a stiff, disk-shaped buttress plate 30. As supported by the buttress plate 30, the reinforcing member 29 has a spring action to normally press the diaphragm 26 into a downwardly bowed position centrally displaced from the plate.

However, upon intensification of the fluid pressure within the compartment 25, the diaphragm 26 and reinforcing member 29 are centrally flexed upwardly toward the plate 30. This action is imparted to a mechanical control element or plunger 31 which, in this instance, constitutes a short cylindrical section of insulating material, such as Bakelite, reciprocably mounted in a central aperture 32 in the plate 30. As shown, the lower end of the control element 31 abuts the central portion of the reinforcing member 29 and the upper end projects into the upper portion of the casing cavity 19.

The open end of the casing body 17 above the buttressing plate 30 is closed by an insulating cap 34 whereby the casing cavity 19 becomes an internal chamber 35 that includes the compartment 25. To retain the cap 34 against outward movement the upper peripheral edge of the casing body 17 is crimped over the marginal edge of the cap. A cylindrical extension 36 depends from the marginal edge of the cap, underlying the crimped cup edge, into interabutting engagement with the buttress plate 30.

The enclosed space between the buttress plate 30 and the cap 34 houses the electrical assembly 15 which cooperates with the actuator 16 to provide a compound electrical control. Two electric terminals 37 and 39, adapted to be connected in series with the circuit 40 of the brake light system 12, pierce the cap 34 and extend into the upper end of the casing chamber 35. These terminals are bridged electrically in response to upward or extension movement of the mechanical control element 31 induced by pressurization of fluid in the compartment 25. For this purpose a stationary contact 41 is provided on the inner end of the terminal 37. A complementary movable contact 42, electrically connected with the terminal 39, is carried into engagement with the stationary contact 41 by upward movement of the control element 31, mechanically interconnected with the movable contact. The arrangement by which the two contacts are thus initially closed is correlated with over control means automatically operable to effect an intermittent separation of the contacts 41, 42 so long as the control element 31 remains in raised or extended position.

In the exemplary form of the invention, the movable contact 42 is carried by the free end of an elongated solenoid core 44 which extends transversely across the casing chamber 35 above the buttress plate 30. The opposite end of the core 44 is supported in cantilever fashion by a resilient electrical conductor 45 interconnected with the second terminal 39. The movable contact 42 is insulated from the core 44 by an insulating pad 46 and electrically interconnected with the terminal 39 by a solenoid winding 47 on the medial portion of the core 44.

Normally, the two complementary contacts 41 and 42 are maintained in spaced relation to each other, preferably by means of a spring 49 connected to the solenoid core 44 of the movable contact assembly and reacting against the casing cap 34 at a point directly above the mechanical control plunger 31. Upward or energizing control movement of the plunger 31 is yieldably transmitted to the movable contact assembly by a second spring 50 which acts in opposition to the spring 49 to establish an initial engagement of the movable contact 42 with the contact 41.

This electrical bridging of the terminals 37 and 39 energizes the warning light circuit 40 and at the same time produces a flow of electrical current through the solenoid winding 47 interconnected between the terminals. Hence, a magnetic field is established in the solenoid core 44 whereby the core is attracted downwardly toward a magnetic member 51 disposed between the core and the actuator 16. By overcoming the resilient equilibrium of the springs 49 and 50, this magnetic attraction carries the solenoid core 44 downwardly, thus separating the movable contact 42 from the stationary contact 41 to interrupt the current flow between the terminals 37 and 39. Consequently, both the signal circuit 40 and the solenoid winding 47 are de-energized. With the mechanical control element 31 still in the raised or extended position, the spring 50, in the absence of a magnetic field emanating from the solenoid core 44, raises the solenoid assembly to carry the movable contact 42 back into engagement with the contact 41. Thus, a cyclic circuit closing action ensues which results in the desired pulsating flow of current through the attached signal circuit 40. While many factors enter into the actual determination of the flashing frequency, including such things as circuit resistance, a flashing rate of approximately one or two cycles per second has been found to be satisfactory.

Upon release of the vehicle brakes, the immediate reduction in pressure of the brake fluid within the actuator compartment 25 permits the pressure responsive member 24 to move downwardly under the influence of the resilient member 29, thus retracting or lowering the control element 31 from energizing position under the action of the springs 49 and 50. The consequent reduction in force on the control spring 50 permits the release spring 49 to move the contact 42 out of operative engagement with the contact 41, thereby terminating the cyclic switching action.

As to further details of the automatic current interrupting arrangement, it will be noted that the magnetic member 51 to which the solenoid core 44 is attached is, in this instance, formed as a flat annulus interposed between the buttress plate 30 and the cylindrical extension 36 of the casing cap 35. Preferably, this magnetic annulus 51 is insulated from the latter members by two insulating washers 52 and 54.

To enhance the magnetic interaction between the annulus 51 and the solenoid core 44 the free end of the latter is flared transversely in opposite directions to form a T-shaped head 55 overlying a substantial area of the annulus.

Referring again to the overall characteristics of the compound control device 10, it should be noted that its cyclic circuit closing action is controlled directly by the mechanical movement of a hydraulic actuator. This overall action is achieved by a strikingly simple construction well suited for economical manufacture. Moreover, the self-contained unit thus provided can be assembled into new vehicles with exactly the same ease as conventional pressure operated brake light controls. Also, since this unit is ordinarily connected to the fluid brake and light systems of a vehicle (not shown) in the same manner as conventional control switches, it is well adapted to be substituted for such conventional switches in vehicles already in use.

Comparing favorably in cost with conventional fluid controlled switches which produce only a steady energization of brake lights, applicant's control device 10 has the added feature of providing for a pulsating signal which is far more conspicuous. This is of special advantage at night, when the flashing signal becomes an unmistakable warning to trailing motorists, whereas a steady signal usually is, in effect, only an intensification of the brilliance of the tail light of the vehicle (not shown).

By virtue of the unitary character of the compound signal system its operation can be checked by a simple single-step maintenance test. Thus, its functional advantages are realized without complicating the problem of isolating operational failures of the signal system as a whole. This is clearly a worth while advantage from the maintenance standpoint.

In view of the disastrous consequences which may ensue from a failure of the brake system into which applicant's control device is installed, it is fitting to consider briefly its special attributes from the safety standpoint. Thus, despite the compound functional action of the device as a whole, it is so constructed that its fluid-tight integrity is not only preserved by the positive action of sturdy structural parts, but is further insured by the potential fluid containing action of secondary structural elements. Thus, it will be perceived that fluid in the actuator compartment 25 is prevented from entering the upper portion of the chamber 35 by the diaphragm 26 as positively reinforced by the structural elements 29, 30, 51, 52, and 54, together with the cylindrical extension 36 of the cap 34 which directly underlies the crimped edge of the casing body 17. Thus, the possibility of fluid escaping into the upper portion of the casing chamber 35 is so extremely remote as to be virtually inconceivable. However, any leak of this nature would still not result in a critical loss of brake fluid through the control device 10 because any fluid which may leak into the upper portion of the chamber 35 is still entrapped by the cap 34 itself, which is locked sturdily in position by the casing body.

I claim as my invention:

1. For use with a vehicular hydraulic brake system and brake light circuit, a unitary electrical control device for effecting a cyclic closing of the circuit in response to an intensification of fluid pressure within the brake system, said control device comprising, in combination, a casing defining an internal chamber therein, a fluid responsive actuator in said chamber and defining therewith a compartment for actuating fluid, attaching means on said casing defining an inlet communicating with said compartment and adapted to interconnect said casing with the vehicle hydraulic brake system, electrical terminals on said casing, electrical contacts disposed within said casing chamber and connected with said terminals, means within said casing normally separating said contacts, mechanical control means interconnected between said actuator and at least one of said contacts for mechanically closing said contacts in response to pressurization of fluid within said compartment, and electrical current responsive interrupting means mechanically and electrically interconnected with one of said contacts for automatically effecting intermittent separation of said contacts, said separating means serving to terminate further engagement of said contacts in response to mechanical retraction of said control means.

2. A cyclic electrical switching device controllable by brake fluid pressure and comprising, in combination, a casing including an open ended cup-shaped body, an insulating cap closing the open end of said body and defining therewith an internal chamber, a flexible diaphragm extending transversely across said chamber and defining therewith a fluid receiving compartment in the end thereof remote from said cap, attachment means on said casing defining a fluid inlet communicating with said compartment, a control element movably mounted in said chamber and coacting with said diaphragm to be actuated thereby in response to fluid pressure in said compartment, two electrical terminals in said cap extending into said compartment, a movable electrical solenoid core of substantial permeability extending transversely across said compartment under said cap, an electrical contact in said compartment connected with one of said terminals, a complementary contact carried by said core, a solenoid winding on said core having opposite ends connected respectively to said complementary contact and to the other of said terminals, a magnetic member disposed between said core and said diaphragm, a first spring interconnected between said casing and said core for biasing the latter toward said diaphragm to open said contacts, and a second spring interposed between said control element and said solenoid core to resiliently close said contacts upon extension movement of said element, said solenoid core and winding being cooperable magnetically with said magnetic member to produce cyclic opening of said contacts so long as said control element remains in extended position.

3. A cyclic electrical switching device controllable by brake fluid pressure and comprising, in combination, a casing including an open ended cup-shaped body, an insulating cap closing the open end of said body and defining therewith an internal chamber, a pressure responsive member disposed within said chamber and defining therewith a fluid receiving compartment, attachment means on said casing defining a fluid inlet communicating with said compartment, two electrical terminals in said cap, a movable electrical solenoid disposed within said compartment under said cap, a first electrical contact in said compartment connected with one of said terminals, a movable contact carried by said solenoid and electrically connected thereby to the other of said terminals, a magnetic member disposed within said chamber adjacent said solenoid, and a resilient element interconnecting said pressure responsive member and said solenoid to bias said movable contact into engagement with said first contact, said solenoid coacting magnetically with said magnetic member to produce cyclic opening of said contacts.

4. A unitary electrical control device comprising, in combination, a hollow casing, a pair of electrical terminals on said casing, a fluid pressure responsive actuator mounted in said casing, means defining a fluid inlet in said casing communicating with said actuator, a switch element cooperating with said terminals and movable between off and on positions, a mechanical control means interposed between said actuator and said switch element and so arranged that said element is moved toward its on position upon a change of pressure in said actuator, and means responsive to the resulting flow of current between said terminals for cyclically breaking the electrical circuit.

5. A self-contained, fluid pressure responsive electrical control unit comprising, in combination, a casing defining a chamber therein, a fluid pressure responsive actuator disposed within said chamber and defining therewith a fluid receiving compartment, attaching means on said casing defining a fluid inlet into said compartment and adapted to interconnect said device with a hydraulic brake system, a mechanical electrical control within said chamber and including an element mechanically connected with said actuator and movable thereby in response to pressurization of fluid within said compartment, a pair of electrical terminals on said casing, a pair of complementary electrical contacts interconnected with said respective terminals, said control element being mechanically connected with one of said contacts for causing engagement thereof with the other of said contacts, and said control further including electrical current responsive interrupting means within said chamber mechanically interconnected with one of said contacts and with said element for causing intermittent separation of said two contacts.

References Cited in the file of this patent

UNITED STATES PATENTS

| | | |
|---|---|---|
| Re. 17,835 | Jacobs | Oct. 21, 1930 |
| 1,613,305 | Batcheller | Jan. 4, 1927 |
| 1,998,823 | Schmidinger et al. | Apr. 23, 1935 |
| 2,164,821 | Katcher | July 4, 1939 |
| 2,255,381 | Ellery | Sept. 9, 1941 |
| 2,275,556 | Rasmussen | Mar. 10, 1942 |